United States Patent [19]

Howe

[11] 4,176,377
[45] Nov. 27, 1979

[54] VIDEO DISC CONFIGURATION

[75] Inventor: Dennis G. Howe, Fairport, N.Y.

[73] Assignee: Eastman Kodak Company, Rochester, N.Y.

[21] Appl. No.: 850,162

[22] Filed: Nov. 10, 1977

[51] Int. Cl.² .................. G11B 7/26; G11B 25/10; G01D 15/10
[52] U.S. Cl. ................... 358/128; 346/76 L; 358/129; 360/135
[58] Field of Search .......... 358/128, 129, 130; 360/135; 179/100.4 C, 100.3 V, 100.3 Z; 346/76 L, 135, 137

[56] References Cited

U.S. PATENT DOCUMENTS

| | | | |
|---|---|---|---|
| 3,258,750 | 6/1966 | Shew | 360/135 X |
| 3,430,966 | 3/1969 | Gregg | 346/137 |
| 3,560,994 | 2/1971 | Wolff et al. | 346/76 L |
| 3,800,099 | 3/1974 | Dickopp et al. | 179/100.4 C |
| 3,832,948 | 9/1974 | Barker | 346/76 L |
| 3,902,010 | 8/1975 | Goshima | 358/128 |
| 3,943,302 | 3/1976 | Johnston, Jr. | 179/100.4 C |

Primary Examiner—Bernard Konick
Assistant Examiner—Donald McElheny, Jr.
Attorney, Agent, or Firm—John D. Husser

[57] ABSTRACT

In accordance with the present invention, video information is recorded on a video disc at a high packing density using a disproportionately large record spot. According to a presently preferred embodiment, a recordable video disc has a surface sensitive to recording only along a narrow spiral track, which spiral track is followed during recording by a tracking device to compensate for tracking errors arising from disc eccentricity, wobble, and optical system vibration, while limiting the cross-track dimension of recorded video information to allow a higher cross-track packing density.

10 Claims, 7 Drawing Figures

VIDEO DISC CONFIGURATION

BACKGROUND OF THE INVENTION

1. Field of the Invention

The present invention relates to video discs and, more particularly, to a video disc configuration permitting a high packing density of video information.

2. Description Relative to the Prior Art

It is highly desirable that video recorders be small, lightweight and inexpensive. The complex processes involved in recording and playing back video information, however, pose serious problems to the design of a commercially acceptable video recorder for consumer or business applications. In particular, in a video recorder wherein a laser is used to record video information on a disc, the conventional gas laser which is commonly employed renders the recorder relatively bulky and expensive due to the gas laser tube itself and its associated power supply. Further, such lasers generally require a high bandwidth electro-optic modulator or other similar device to modulate the laser beam intensity in accordance with video information. In other respects, however, conventional lasers are well suited for video recording. For example, the laser beam can be focussed to a spot size less than a micron in diameter thereby permitting a high packing density for the billions of video information data bits which are recorded on the disc.

Another type of laser, the solid state diode laser, is available which in some respects represents a highly desirable improvement over the conventional gas laser. The diode laser is much smaller and can operate in the presence of relatively large amounts of shock and vibration. The use of a diode laser eliminates the gas laser tube and its power supply, and also eliminates the expensive high-bandwidth optical modulator and associated circuitry. Still further, diode lasers are less sensitive to environmental conditions, provided only that they are properly cooled. In an extremely adverse operating environment, the diode laser can be protected from the environment by placing it in a hermetically sealed package or container.

In certain other respects, however, the diode laser is not so well suited for video recorder appliications. In particular, the diode laser emits radiation from a planar, slit shaped junction layer having dimensions on the order of 1 micron thick by 15 microns wide, and the resulting output-beam has an extremely anamorphic divergence, generally on the order of 10°×50°. The smallest obtainable focussed spot having sufficiently high power density to effect laser recording will, therefore, be highly elliptical in shape as the result of the fan shaped diode laser output beam. (It is possible to obtain a focussed beam of circular cross section by not using substantial portions of the fan shaped output of the diode laser, but then the power density of the spot is too low for most laser recording applications.) In addition, the wavelength of the emitted radiation from currently available diode lasers is relatively long, from 800 to 950 nm. Even assuming a diffraction limited optical system having a moderately high numerical aperture, for example a numerical aperture of 0.5, the smallest spot dimension obtainable from even a circular beam of such wavelength will be on the order of 2 microns. And a focussed anamorphic diode laser beam of the type described above would have minimum dimensions on the order of 2×9 microns.

In general, a focussed spot having an elliptical geometry on the order of 2×9 microns would not be suitable for high density optical recording of video information on a video disc or other form of video record device. With recording spots of this size, the smallest dimension preferably is oriented along the data track in order to preserve the recorded bandwidth. But orienting the large dimension of the recording spot in the cross-track direction necessitates the use of large track-to-track spacings, thereby substantially lowering the overall packing density and seriously reducing the total storage capacity of the disc.

But even if the non-circular geometry of the focussed spot can be eliminated by the development of improved diode lasers (e.g., buried channel heterostructure devices or by the use of a multi-element optical collimation system which has anamorphic magnification to correct the asymmetric diode laser output beam) which produce a high numerical aperture conical output beam having enough power to effect recording, the minimum practical spot diameter will still be on the order of 2 microns due to the relatively long wavelength of the emitted radiation. The use of a recording beam on the order of 2 microns in size will result in reduced bandwidth of the recorded video information and reduced cross-track packing density since adjacent record tracks apparently must be spaced further apart to accommodate the larger recording beam. While the 2 micron recording spot size may be marginally acceptable for some video recording applications wherein storage capacity is not at a premium, in many applications it is still highly desirable to increase the cross-track packing density of information recorded on a video disc to approach that obtained from the use of conventional gas lasers.

SUMMARY OF THE INVENTION

While in prior art video disc recording devices the cross-track size of the record spot places a direct limit on the packing density of recorded video information, the present invention provides a video disc configuration which allows a higher packing density of recorded video information for a given cross-track record spot size. Further, the video disc configuration in accordance with the present invention is also used to compensate for disc centering errors and recording system vibration. In a presently preferred embodiment of the invention, a recordable video record device has a surface sensitive to recording radiation only along a narrow record track. The width of the record track limits the cross-track dimension of the recorded video information thereby allowing a higher cross-track packing density. During recording, the record track is followed by a tracking device to compensate for disc eccentricity, wobble, and optical system vibration.

BRIEF DESCRIPTION OF THE DRAWINGS

In the detailed description of the preferred embodiments of the invention presented below, reference is made to the accompanying drawings, in which.

DETAILED DESCRIPTION OF PREFERRED EMBODIMENTS

Figure 1:
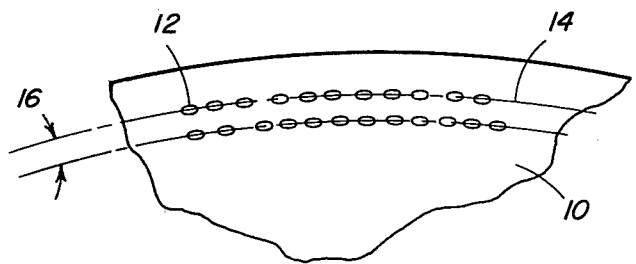
FIG. 1 shows a representative portion of a video disc having video information recorded thereon using a conventional laser.

Referring to FIG. 1, a portion of a video disc 10 is shown having video information in the form of data bits 12 recorded thereon using a conventional gas laser having a beam of circular cross section. The data bits 12 may be in the form of spaced apertures, pits, bumps, etc. Using a conventional gas laser it is possible to obtain a focussed record spot size of less than 1 micron in diameter. As a result, the data bits 12 can be closely packed both in the cross-track direction 16 and along the recording track 14. The result is a video disc of manageable size (i.e., a 12 inch diameter) and upon which a half hour of video program material can be recorded. As discussed above, however, conventional gas lasers present certain problems in video recorder applications. In particular, these lasers tend to be expensive, bulky, heavy and require a high bandwidth optical modulator.

Figure 2:
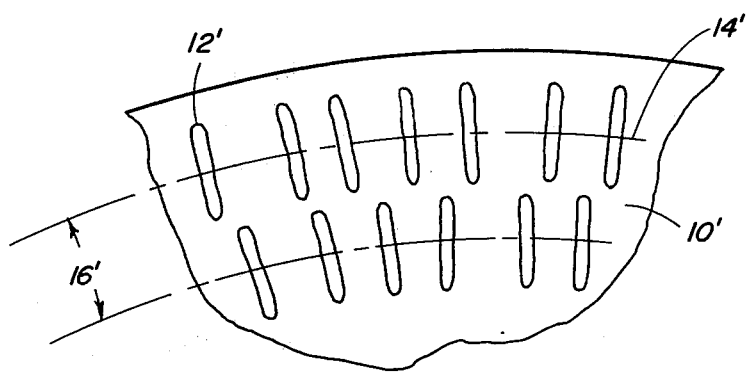
FIG. 2 shows a representative portion of a video disc having video information recorded thereon using the anamorphic output beam of a diode laser.

The diode laser, on the other hand, in addition to being rapidly modulatable without an external optical modulator, is potentially less expensive, lightweight, and compact. It would be a highly desirable improvement to use diode lasers in video recorders for both consumer and business applications. For the reasons previously discussed, however, the focussed beam of a commercially available diode laser has minimum dimensions on the order of 2×9 microns. FIG. 2 shows a portion of a video disc 10' having video information recorded thereon by such a diode laser in the form of data bits 12'. A comparison of FIGS. 1 and 2 clearly shows that the packing density of the data bits 12' recorded by the diode laser is much less than the packing density of the data bits 12 recorded by a conventional gas laser. Most significantly, the cross-track spacing 16' of the recording tracks 14' is about five times as great. The result is that a video disc of much larger diameter would be required to record the same half hour of video program material.

Figure 3:
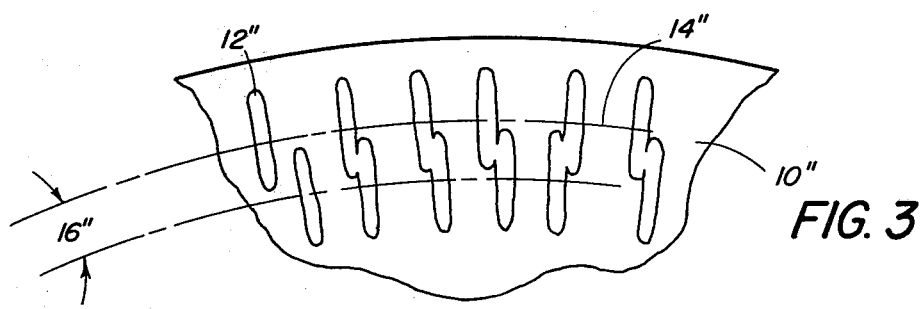
FIG. 3 shows the result of attempting to increase the packing density in the cross-track direction of the video information recorded on the video disc shown in FIG. 2.

If one were to attempt to increase the packing density of the recorded data bits 12' by decreasing the cross-track spacing 16', the result, as shown in FIG. 3, would be a garbling of the recorded video information. Upon readout of such a video disc, the video information reproduced would be unacceptably distorted, especially if tracking errors were present. For example, if FM encoded information were recorded, readout would result in false frequency information rather than mere amplitude modulation of the FM carrier. In the case of digital recording, bit errors would result.

Figure 4:
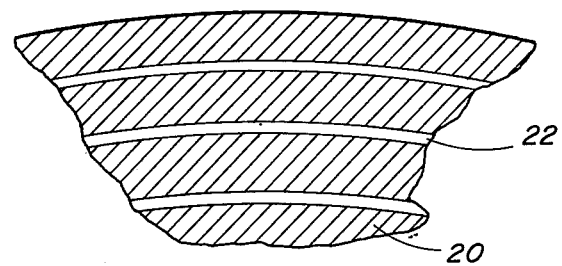
FIG. 4 shows a video disc configuration in accordance with the invention for providing a higher packing density.

FIG. 4 shows a recordable disc 20 having a configuration in accordance with one embodiment of the present invention. Rather than the entire surface of the recordable disc 20 being sensitive to recording energy (which energy may be in the form of electromagnetic radiation from a laser beam, a magnetic field from a magneic record head, etc., as discussed more fully below) only a select portion is sensitized along a spiral track 22. As will be seen from the discussion below, even though the same diode laser is used to record video information on the recordable disc 20, the cross-track spacing between recording tracks 22 can be substantially reduced with no distortion or overlap of the recorded video signal.

Figure 5A:
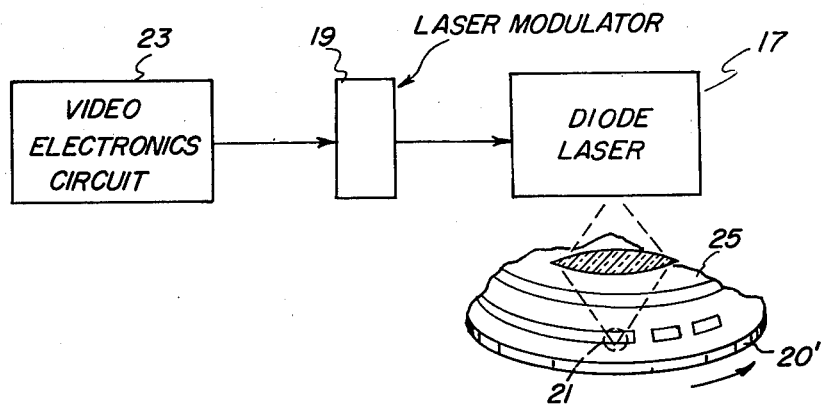
FIGS. 5 and 5a illustrating the use of the video disc of FIG. 4 in connection with video information recording using a diode laser.
Figure 5:
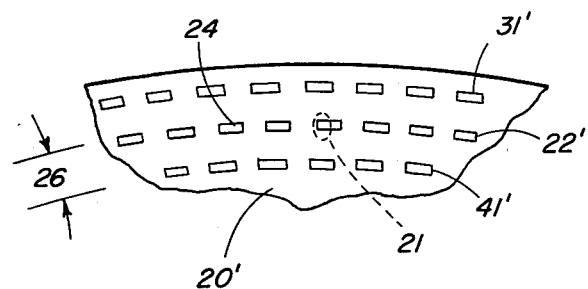

Referring to FIGS. 5 and 5a, the result is shown of using a diode laser 17 to record video information on the video disc 20'. Video information from a video electronics circuit 23 is fed to a laser modulator 19 which modulates the diode laser 17 output beam. The modulated laser beam is focussed to a record spot, represented by the dotted area 21, on the video disc 20' by an optical system 25. As shown in FIG. 5, the focussed record spot 21 is wider than the record sensitive spiral track 22' and, under certain conditions as discussed more fully below, can even overlap adjacent tracks (i.e., the track sections enumerated 31' and 41'). But since the video disc 20' is sensitive to recording radiation only along the spiral track 22', the cross-track dimension of the data bits 24 is limited by the width of the spiral track 22'. Since no record is made of the recording radiation incident upon the disc 20 in areas between the spiral track 22', the recording tracks can be squeezed closer together in the cross-track direction, i.e., the pitch 26 of the spiral track 22' is substantially reduced. Similarly, upon playback the read spot (which, like the record spot, can be disproportionately large) "sees" only the video data bits 24 recorded for a single recording track 22'.

The present invention is of particular utility when the recording material used is a thermal recording material of the laser machinable type such as a thin metal film (of bismuth, for example). During recording, by exposure to a focussed laser beam for example, a micro-area of the machinable material is melted. But only if some portion of this melted material (usually the portion which lies near the center of the focussed record spot where the irradiation level is a maximum) is heated above some threshold temperature, i.e., the vaporization temperature, will the melted area of the recording material draw back to form a recorded aperture. The present invention recognizes that the recording threshold temperature will only be reached in the vicinity of the center of the focussed record spot, i.e., on the recording track upon which the record spot is centered, and that because of the decreasing irradiance levels away from the center of the focussed record spot the irradiance levels will be substantially below that required to cause recording in adjacent tracks even though the record spot overlaps them. Thus, the center to center spacing between adjacent record tracks can be quite small compared to the size of the record spot when thermal recording materials are used. The highest permissible cross-track packing density depends upon the irradiance distribution within the focussed record spot. If the record spot has a high irradiance level in the center which decreases rapidly towards the outer portions of the record spot, the record tracks can be spaced very closely if one follows the teaching of the present invention because vaporization (and thus recording) will not occur on even closely spaced adjacent record tracks. At the other extreme, a record spot which has a uniform irradiance distribution is likely to cause recording on all tracks that it overlaps. In this case the tracks can be spaced apart a distance equal to one-half the cross-track dimension of the record spot, which is the spacing shown in FIG. 5.

The present invention is also useful with highly thresholding integrating recording materials (e.g., high contrast IR film) and thermal recording materials not of the laser machinable type (such as a thin layer of thermoplastic material). In these cases, however, the amount of recording is accumulative and the center spacing between adjacent tracks will, in general, preferably be such that the record spot does not overlap them during recording. The cross-track spacing, therefore, will be somewhat larger than for laser machinable thermal recording materials, yet still less than the minimum permissible cross-track spacing on a uniformly sensitive record device such as the disc 10 shown in FIG. 1.

Apart from allowing a higher cross-track packing density, a further advantage of a disc configuration such as shown in FIG. 4 is that the spiral track 22 on the recordable disc 20 can be followed during the recording operation by a tracking device to maintain the record spot on the spiral track 22, thereby eliminating or reducing the effects of any track eccentricity or wobble that would result from disc centering errors or recorder vibrations. Likewise, upon playback, the recorded spiral track 22' (FIG. 5) is followed by a tracking device to maintain the read spot on the spiral track 22'. Such a recordable disc configuration that provides for the recording of non-eccentric and wobble-free tracks even in the presence of substantial disc centering error and recorder system vibration represents a potentially valuable component in a video recorder for consumer and business applications.

A recordable video disc having a surface sensitive to recording only along a narrow record track as described above can be fabricated in various ways. For exammple, an unmodulated high power laser can be used to thermally scribe away the unwanted surface areas of a uniformly sensitive video record blank. As one example, for the particular case of a spiral record track, the output of the laser can be focussed to a 2 micron diameter spot which is used to thermally scribe a 3 micron pitch spiral in a thin film of bismuth evaporated on glass, plastic or a flexible support such as ESTAR. The 1 micron wide spiral track of bismuth remaining on the support constitutes the recordable video disc. In this case, a laser machining technique could be used to directly record the video information. Or, rather than use the scribed bismuth disc directly for recording, the scribed bismuth disc can be used as a master disc for the photolithographic fabrication of recordable discs having recording sensitive spiral tracks comprised of any one of a number of well known heat, light, or magnetic sensitive materials.

While a presently preferred embodiment of the invention has a record track comprised of a thermal recording material such as a thin film of bismuth, the present invention is also useful in the magnetic recording of information on the video disc. It is known that the in-track packing density of magnetic materials is about equal to that of thermal recording materials such as bismuth. But presently known magnetic recording heads are relatively wide and lead to wide record tracks, thus limiting the cross-track packing density to orders of magnitude less than that obtainable from a focussed laser beam recording system. In accordance with an embodiment of the present invention, a video disc of the configuration shown in FIG. 4 is employed wherein the recording sensitive record track 22 is comprised of a material which is sensitive to recording energy in the form of an electromagnetic field produced by a magnetic record head. Using such a disc configuration, a relatively wide magnetic head is used to record information on the narrow record track 22. In this manner, magnetic record tracks may be recorded which are actually narrower than the narrowest magnetic head, thereby reducing the cross-track spacing and increasing the overall packing density.

Figure 6:
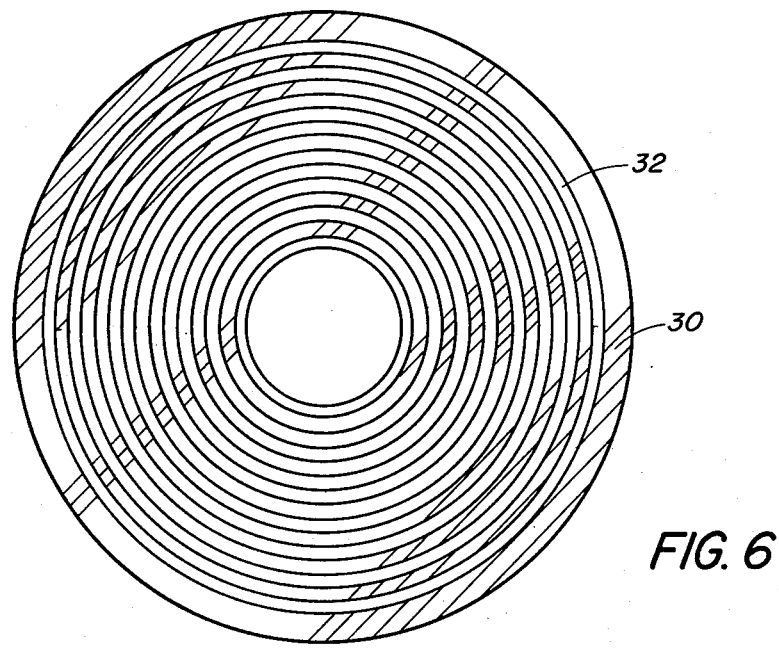
FIG. 6 shows an alternate video disc configuration in accordance with the invention.

In the above embodiment of the invention, the recordable video disc is sensitive to recording radiation along a spiral track. An alternate embodiment of the invention is shown in FIG. 6. In FIG. 6, a video disc 30 is sensitive to recording along concentric circular tracks 32. The size of the tracks 32 have been greatly exaggerated for purposes of illustration. The use and fabrication of such a disc 30 is similar to that described above. It will be apparent to those skilled in the art that many other record track configurations are useful in practicing the invention. The important characteristic is that the sensitized record track be narrow relative to the width of the record spot, magnetic record head, etc.

The invention has been described in detail with particular reference to preferred embodiments thereof, but it will be understood that variations and modifications can be effected within the spirit and scope of the invention.

What is claimed is:

1. In a video record device having a recording sensitive surface comprised of a thermal recording material in which video information can be recorded by exposure to a recording beam focussed to a record spot of predetermined width, said record spot having an irradiance distribution that decreases in intensity away from its center portion, the improvement wherein:
   said surface is sensitive to recording along a spiral record track and is non-sensitive to recording in the region between adjacent tracks, said spiral record track having a pitch such that the spacing between the center of one record track and the nearest edge of an adjacent record track is less than one-half the width of the record spot.

2. A record device as claimed in claim 1, wherein said thermal recording material comprises a laser machinable material.

3. A video record device as claimed in claim 1 wherein said thermal recording material is comprised of bismuth.

4. In a video record device having a recording sensitive surface comprised of a thermal recording material in which video information can be recorded by exposure to a recording beam focussed to a record spot of predetermined width, said record spot having an irradiance distribution that decreases in intensity away from its center portion, the improvement wherein:
   said surface is sensitive to recording along a spiral record track and is non-sensitive to recording in the region between adjacent tracks, said spiral record track being of a width less than the width of the record spot and having a pitch such that the record spot, when focussed on one record track, overlaps at least one adjacent record track but does not record thereon.

5. In a video record device having a recording sensitive surface comprised of a thermal recording material in which video information can be recorded by exposure to a recording beam focussed to a record spot of predetermined width, said record spot having an irradiance distribution that decreases in intensity away from its center portion, the improvement wherein:

said surface is sensitive to recording along adjacent record tracks and non-sensitive to recording in the region between adjacent record tracks, and wherein the center of one record track and the nearest edge of an adjacent record track are spaced apart a distance less than one-half the width of the record spot.

6. In a video record device having a recording sensitive surface comprised of a thermal recording material in which video information can be recorded by exposure to a recording beam focussed to a record spot of predetermined width, said record spot having an irradiance distribution that decreases in intensity away from its center portion, the improvement wherein:

said surface is sensitive to recording along record tracks of widths less than the width of the record spot and non-sensitive to recording in the region between adjacent record tracks, said adjacent tracks being spaced apart such that the record spot, when focussed on one record track, overlaps at least one adjacent record track but does not overlap sufficiently to effect recording thereon.

7. A record device as claimed in claim 6 wherein said thermal recording material comprises a laser machinable material.

8. A video record device as claimed in claim 6 wherein said thermal recording material is comprised of bismuth.

9. Video recording apparatus comprising:

a record device having a recording sensitive surface comprised of thermal recording material in which video information may be recorded;

means for providing a recording beam;

means for focussing said recording beam to a record spot of predetermined width upon said recording sensitive surface, said record spot having an irradiance distribution that decreases in intensity away from its center portion, said surface being sensitive to recording along a spiral record track and non-sensitive to recording in the region between adjacent record tracks, and said spiral record track having a pitch such that the spacing between the center of one record track and the nearest edge of an adjacent record track is less than one-half the width of the record spot, thereby enabling a high packing density of recorded video information to be obtained.

10. Video recording apparatus comprising:

a record device having a recording sensitive surface comprised of thermal recording material in which video information may be recorded;

means for providing a recording beam;

means for focussing said recording beam to a record spot of predetermined width upon said recording sensitive surface, said record spot having an irradiance distribution that decreases in intensity away from its center portion, said surface being sensitive to recording along record tracks wherein the spacing between the center of one record track and the nearest edge of an adjacent record track is less than one-half the width of the record spot and non-sensitive to recording in the region between adjacent record tracks.

* * * * *